US008738535B2

United States Patent
Gaetano, Jr. et al.

(10) Patent No.: US 8,738,535 B2
(45) Date of Patent: May 27, 2014

(54) SYSTEM AND METHOD FOR SOFTWARE SITE LICENSING

(75) Inventors: Arthur Louis Gaetano, Jr., Chandler, AZ (US); Jerry Gin, Gilbert, AZ (US); John Durant, Chandler, AZ (US); Michael Mathew Merriam, Phoenix, AZ (US)

(73) Assignee: Inter-Tel (DE) Inc, Tempe, AZ (US)

( * ) Notice: Subject to any disclaimer, the term of this patent is extended or adjusted under 35 U.S.C. 154(b) by 2291 days.

(21) Appl. No.: 10/675,684

(22) Filed: Sep. 30, 2003

(65) Prior Publication Data

US 2005/0038752 A1 Feb. 17, 2005

Related U.S. Application Data

(63) Continuation-in-part of application No. 10/641,853, filed on Aug. 15, 2003, now abandoned.

(51) Int. Cl.
*G06Q 99/00* (2006.01)
*G06Q 20/00* (2012.01)

(52) U.S. Cl.
CPC ..................................... *G06Q 20/00* (2013.01)
USPC .......................................................... 705/59

(58) Field of Classification Search
USPC ............ 705/51–59; 726/26–33; 380/200–203
See application file for complete search history.

(56) References Cited

U.S. PATENT DOCUMENTS

| 4,924,378 | A | 5/1990 | Hershey et al. |
|---|---|---|---|
| 5,553,143 | A | 9/1996 | Ross et al. |
| 5,671,412 | A | 9/1997 | Christiano |
| 5,724,425 | A | 3/1998 | Chang et al. |
| 5,790,664 | A | 8/1998 | Coley et al. |
| 5,826,011 | A | 10/1998 | Chou et al. |
| 5,905,860 | A | 5/1999 | Olsen et al. |
| 6,009,401 | A | 12/1999 | Horstmann |
| 6,023,766 | A | 2/2000 | Yamamura |
| 6,078,909 | A | 6/2000 | Knutson |
| 6,169,976 | B1 | 1/2001 | Colosso |
| 6,189,146 | B1 * | 2/2001 | Misra et al. .................... 717/177 |
| 6,233,567 | B1 | 5/2001 | Cohen |
| 6,460,140 | B1 | 10/2002 | Schoch et al. |
| 6,510,502 | B1 | 1/2003 | Shimizu |
| 6,513,121 | B1 | 1/2003 | Serkowski |
| 7,209,902 | B2 * | 4/2007 | Stefik et al. ...................... 705/59 |
| 2002/0049679 | A1 * | 4/2002 | Russell et al. .................. 705/52 |
| 2002/0072983 | A1 | 6/2002 | Teller |
| 2002/0091644 | A1 | 7/2002 | Wong et al. |
| 2002/0138764 | A1 | 9/2002 | Jacobs et al. |
| 2002/0147922 | A1 | 10/2002 | Hartinger et al. |
| 2003/0033214 | A1 * | 2/2003 | Mikkelsen et al. ............. 705/26 |

OTHER PUBLICATIONS

HASP,Software Protection—The Need,the solutions,and the Rewards,white paper,Dec. 2001,pp. 3-16,Israel.

* cited by examiner

*Primary Examiner* — James D Nigh

(57) ABSTRACT

The software site licensing system includes a client site having a target unit and a license sales site for generating a corresponding site license. The sales site receives an order for a target unit from the client and sends the physical order to a warehouse for shipping. The sales site determines the intangible portion of the order and establishes a virtual warehouse for the client to inventory the intangibles (license components). The warehouse notifies the sales site of the unique identifiers on the target prior to shipping so the sales site can link the en-route target with the client. The client accesses its personal virtual warehouse and selects the license components desired for the site license. The system assembles the site license and upon request, transmits the site license from the virtual warehouse to the target unit for installation.

8 Claims, 15 Drawing Sheets

Fig. 10

SYSTEM AND METHOD FOR SOFTWARE SITE LICENSING

CROSS REFERENCE TO RELATED APPLICATIONS

The present invention is a continuation-in-part that includes subject matter related to and claims priority from U.S. patent application Ser. No. 10/641,853 filed on Aug. 15, 2003, now abandoned under the same title and incorporated herein by reference.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF INVENTION

The present invention relates generally to software site licensing.

BACKGROUND OF THE INVENTION

In a non-networked computer environment, it is a simple matter to enforce a software site license. Licensed software is installed on a single computer and each user's access to that computer is controlled by individual logins. The software is restricted to one machine and the number of logins is limited to a particular software application to prevent unauthorized use that is not covered by the site license. As more processing systems gradually become networked together, thereby enabling a single software application to be "shared" over multiple computers, the issue of enforcing the software site license becomes increasingly problematic. Thus, controlling the legal distribution and use of licensed software is critical to prevent unauthorized software use or "piracy."

Any unauthorized duplicating, browsing, or using of a software product or data constitutes software piracy. There are various categories of software piracy including; (i) "softlifting" or purchasing a single licensed copy of software and loading it onto several computers; (ii) making unauthorized copies of software available to end users through online downloading and uploading; (iii) illegally duplicating and selling software; and (iv) selling stand-alone software that was intended to be bundled with specific hardware. Although most computer users are aware that the unauthorized duplication and use of software is illegal, there is a general disregard for the importance of treating software as valuable intellectual property. Often times the legitimate owner of the software or data product knowingly permits the software to be duplicated onto multiple machines to avoid the extra cost of additional licensing fees or the time needed to obtain additional licenses, even if they are free. These acts of software piracy are typically the most difficult to control.

The Internet provides increased connectivity for users worldwide but unfortunately at the cost of preserving software security. File sharing over the Internet is a common occurrence due to the elimination of physical as well as international software barriers. Even the software publishers that have proactively attempted to protect their software through site licenses, encryption, passcodes, and various other methods, were not fully prepared for the numerous hacking programs that compromise software security and licensing mechanisms.

In spite of the potential of increased software piracy, using the Internet as a legal vehicle for software distribution can be advantageous. Internet distribution of software from the licensor to the licensee altogether eliminates lost or damaged goods as well as late deliveries. Software vendors can electronically distribute software upgrades and additional components or modules, in conjunction with the original software license over the Internet and in higher volumes. For software recipients, Internet distribution means receiving the products faster and discounted by saving on media, shipping, labor, and storage costs.

Unlike software, hardware products cannot be distributed over an Internet channel but must be physically delivered to the customer. The separation between the software and hardware introduces additional challenges for the software vendor to track software intended for a particular hardware unit. Thus, the licensor often pre-packages the software with the machine at the time of purchase (establish the hardware/software match prior to the sale). For example, the software vendor can distribute software on computer-readable media containing a serial number or some other special identifier. When the software is installed on the machine, the unique identifier stored on the media is matched with the particular machine, thereby "unlocking" the software and essentially providing a hardware/software match. If the software is moved to another machine, the licensee typically contacts the licensor again for permission to install the software on a different machine. This approach does not generally work well for software that is downloaded from a communication channel, such as the Internet, or otherwise mass distributed.

Alternatively, the licensor can request that the customer download the software after the hardware purchase and enter the unlocking ID information at that time. The problem with this approach is that the integrity of the information can be jeopardized since it is not the licensor or manufacturer entering the information, but the customer. Also, there is no provision to track the hardware from manufacture to sale. On the other hand, during the online software registration process the system can obtain a serial number or such from the CPU in a completely transparent process to the user. While this latter approach may help eliminate some entry errors, it does not allow any flexibility in configuring the software license.

Software licenses are typically generated for the end user at the time of purchase of the associated software or at installation. For instance, the license may be created initially for a certain number of users and specific features. Any changes to the initial license require the licensee to contact the licensor and request an updated license which generally incurs additional cost to the licensee. The licensee is not able to pre-purchase software licenses or individual features of the license and store these intangible items for some future date. Rather, the vendor creates the license for the user for immediate installation of the software and charges the user at the time of installation. In this manner, the user has no opportunity to update the license without additional intervention from the licensor due, in part, to the user's inability to pre-pay for a license or license features, store the intangible items, and at some future date create a license from the stored features.

Many software vendors are turning to trusted third parties or clearinghouses to manage the licensing process, often times over an Internet channel. In these systems, a third party acts as an intermediary between the software buyer and the vendor to monitor access to the software, authorize use of, report use of and various other functions relating to the licensing of the software. One problem with these types of systems is the added cost associated with using the third party.

Accordingly, an improved system and method for software site licensing is needed. Preferably, a controlled system for tracking unique identifiers of machines from the time of manufacture through license generation of an installed software application is desired. It would be beneficial to utilize the speed and convenience of the Internet for licensing generation and distribution without compromising security. Additionally, it is desirable to allow the user to pre-pay for a software license and licensing features, and hold the license and features in a "virtual warehouse" until such time as the user is ready to generate a specific license incorporating the stored features.

SUMMARY OF THE INVENTION

A software site licensing system of the invention generally includes a client site having a target hardware device, and a license sales site generating a software site license comprising licensable components purchased for the target hardware device. A virtual warehouse includes a personal inventory of intangible items for the client including the licensable components and software site license. A programming workstation receives the software site license from the virtual warehouse and provides the license to the target.

In one particular embodiment, the programming workstation receives an electronic file transfer of the software site license.

In another embodiment, the virtual warehouse is password protected and requests entry of a password unique to the client and an ID unique to the target hardware device.

Another software site licensing system of the invention generally includes a license site receiving a purchase order on behalf of a client. The license site establishes a physical hardware component of the order and a corresponding intangible license component of the order. A physical warehouse receives the physical component and ships the hardware to the client. A secure virtual warehouse website created solely for and viewable by the client receives the intangible license component of the order as a paid-for item. The item remains in the virtual warehouse until a software site license is generated by the license site for installation to the hardware component.

A method for generating a software site license generally includes marking a hardware unit with a distinctive identifier and electronically associating an identifier to an end-user purchasing the unit. Establishing a virtual warehouse uniquely for the end-user and configured to retain a personal intangible inventory for the end-user. The inventory includes a plurality of licensable components intended for the hardware unit. Associating one of the identifiers to the licensable components in the virtual warehouse and password-protecting the virtual warehouse so that viewing of the inventory is permitted upon correct entry of an end-user password and at least one of the hardware unique identifiers. The end-user makes a selection of the licensable components on the virtual warehouse and they are assembled to form the software site license intended for the hardware unit. The license stays on the virtual warehouse until a request for transmission is received and upon the request, the license is transmitted from the virtual warehouse to the hardware unit for installation.

In one embodiment of the method, the selection from the end-user is reviewed and verified so that the selection provides the minimum required software site license for the hardware unit.

In another embodiment, suggested additional licensable components for the license are provided prior to assembling the license.

In yet another embodiment, the selection of licensable components is displayed for a confirmation from the end-user prior to assembling the license.

In still another embodiment, the license is set with an expiration date.

The method in accordance with the invention may be for generating a new software site license, upgrading an existing license, or transferring an existing license to a new hardware unit.

A process for vendor site licensing of a hardware component generally includes receiving, at the time of manufacture, an electronic shipment of unique identifiers associated with the hardware component. Receiving from a warehouse, a data shipment of the physical whereabouts of the component and prior to the transmission of the data to the vendor, the data verified by matching the unique identifiers with an external code of the component. The vendor processes a purchase order for the hardware component, which includes determining an intangible portion of the order. The vendor creates a virtual warehouse and places the intangibles therein. The external code of the component is received by the vendor prior to the physical shipment of the CPU from the warehouse. An association between the intangible portion, the external code, and the unique identifiers is made. The site license is generated from the intangible portion and provided to the order originator for installation to the hardware component.

BRIEF DESCRIPTION OF THE DRAWINGS

These and other features, aspects, and advantages of the present invention may be best understood by reference to the following description taken in conjunction with the accompanying drawings, wherein like reference numerals indicate similar elements:

FIGS. 8-12 illustrate various screen shots from an exemplary virtual warehouse in accordance with the invention.

DETAILED DESCRIPTION

The systems and methods of the invention are particularly useful in software site licensing of telecommunication software applications. As a result, the various aspects of the invention may be conveniently described with reference to the telecom industry. Moreover, the systems and methods of the invention significantly benefit vendors selling hardware and software combined packages, as is common in the telecom industry. However, as will become apparent from the following disclosure, the invention is useful for site licensing of various hardware and software applications in many different industries.

In general, the invention provides an improved system and method for software site licensing and includes subject matter related to and claims priority from commonly owned U.S. patent application Ser. No. 10/641,853 filed on Aug. 15, 2003, under the same title and incorporated herein by reference. The software licensor is able to identify and track details about hardware devices, such as CPUs (central processing units), from the point of their creation to the point of shipment and license installation. The software licensor monitors the movement of licensable hardware both in a physical shipment (i.e., shipping boxed units having ID tags) and a data shipment (i.e., routing electronic data of CPU serial numbers) from the time of manufacture at the factory to the client site. When an end-user orders a licensable hardware component, e.g., a CPU, the vendor distributes the hardware to the user in a conventional manner, and stores license components associated with the particular CPU in a virtual warehouse created uniquely for the user. The virtual warehouse contains intangible items such as the software license and any features to the software application the customer desires. Typically, the license components in the virtual warehouse are pre-authorized line items waiting for assembly into a license. When the user is ready to activate the license, the individual license components are selected from the virtual warehouse, assembled into a software site license, and delivered to the target machine located at the client site.

A more detailed description of exemplary systems and methods for software site licensing in accordance with the invention will follow, to include a preferred embodiment and best mode.

Software Site License System

Figure 1:
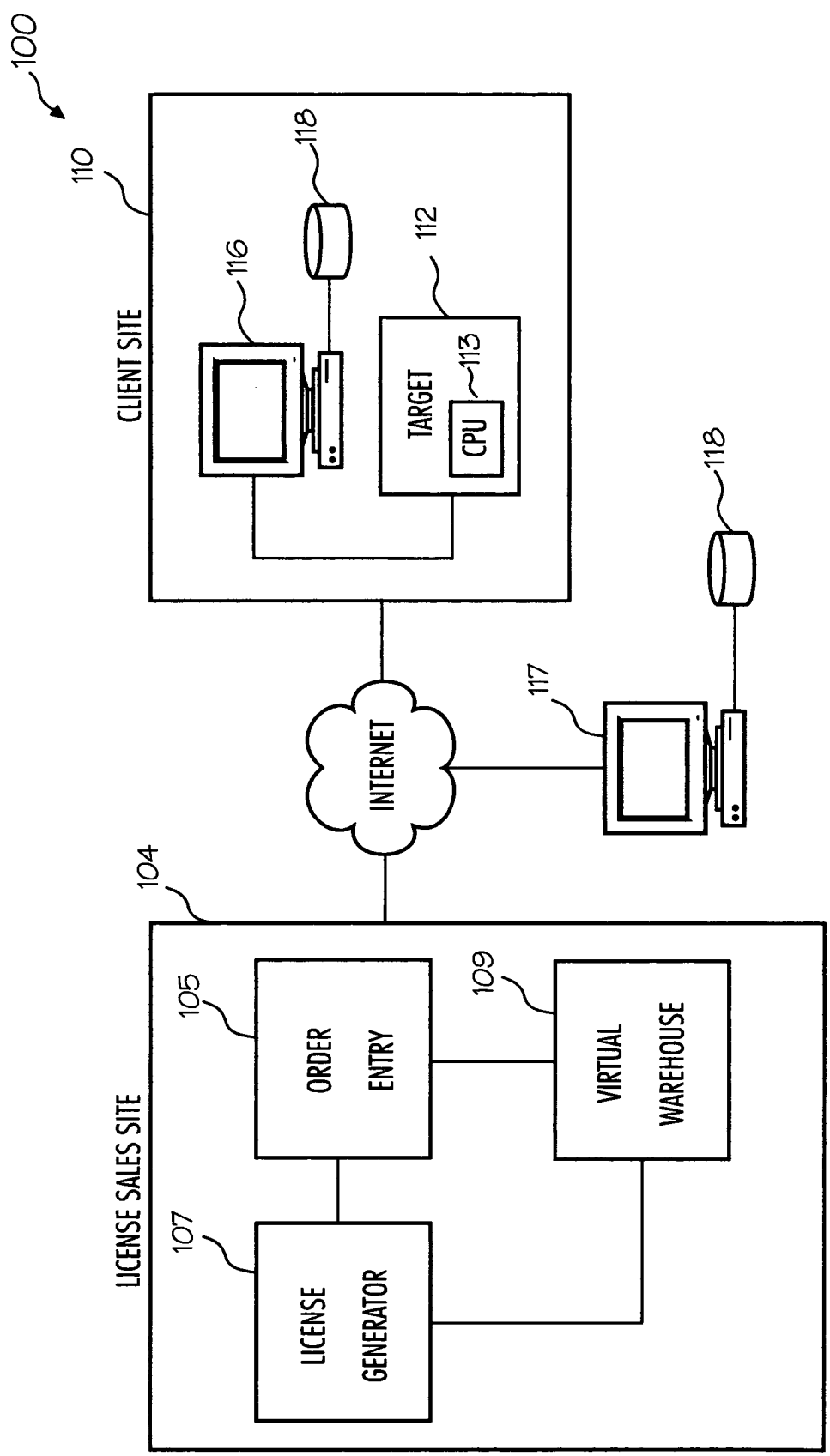
FIG. 1 illustrates a software site license system in accordance with one embodiment of the invention.

FIG. 1 illustrates a software site license system 100 in accordance with an embodiment of the present invention. System 100 generally includes a license sales site 104, a programming workstation 116-117, and a client site 110. License sales site 104 may include any suitable electronic/digital storage system capable of generating, storing and/or transmitting digitally produced files. In another sense, the license sales site may include (and referred herein as) a software license issuing entity having a license generating and storage facility containing the digital license files. In one particular embodiment, license sales site 104 represents a software vendor having one or more license-related computer files stored on a database for electronic distribution to client site 110.

License sales site 104 generally includes an order entry server 105, a license generator 107, and a virtual warehouse 109. Order entry server may include any suitable order receiving means such as an electronic data receipt from an online web order, a manual order entry to a shared database (such as is common in an ERP network), a data facsimile order entry, or various other means of receiving an end user order.

As will be more fully discussed below, one aspect of the invention is the sales site's ability to separate the physical order (i.e., hardware) from the intangible order (i.e., software site license) and track the delivery of both to the client site. In this sense, the system reviews the end user's order and places the licensable components needed for the particular hardware in the end user's virtual warehouse 109 for future retrieval. Also, the end user may order additional features, other than the standard license features needed for the hardware, and these features are also placed in the user's virtual warehouse 109. Virtual warehouse 109 is generally a secure web site to store and assemble intangible licensable features for the end user. License generator 107 may be any suitable server system in communication with order entry 105 and virtual warehouse 109 and may even store data in the virtual warehouse 109. In general, license generator 107 creates and saves the end user licenses in the virtual warehouse. Additional details surrounding the particular elements of the license sales site 104 are provided in the following discussions.

Programming workstation 116-117 includes a storage device 118 and may include any computing device capable of executing and storing software applications. Typically, programming workstation 116-117 establishes a connection with license sales site 104, e.g. via the Internet, receives the generated license from virtual warehouse 109, and stores the license in storage 118 until upload to client site 110. Storage 118 includes any suitable storage means such as a disk-based database, memory, removable media, and/or data logging devices. It should be appreciated that programming workstation 116-117 may include multiple memory elements used for storing a variety of data and applications within the workstation. Additionally, it should be appreciated that storage 118 may include one or more storage elements capable of storing data immediately relevant to the invention as discussed herein, as well as various other data. Additionally, programming workstation 116-117 preferably includes a suitable input means (e.g., keyboard, touch screen, voice recognition, etc.) and a display. As will be discussed in more detail below, one aspect of the invention includes viewing the contents of a virtual warehouse containing license components purchased by the end user.

It should be realized that system 100 may include a single programming workstation 116-117 or a combination of local (e.g., workstation 116) and/or remote (e.g., workstation 117) programming workstations. The programming workstation may establish a direct connection with license sales site 104 or through a web connection. License sales site 104 generates and issues valid licenses for client site 110. The license, either generated or in component form, is stored in license sales site 104 (e.g., at end user virtual warehouse 109). The license is eventually delivered to the client or a suitable programming workstation for installation. In one particular embodiment, a backup of the license remains in the virtual warehouse even after installation. A license transfer from sales site 104 to workstation 116-117 can occur via any number of techniques. For example, in one particular embodiment, the workstation receives a file transfer (download) representative of the license from the sales site. Alternatively, license sales site 104 may email the license file to programming workstation 116-117. In still another embodiment, the license file is delivered to programming workstation on a computer-readable media product, such as CD, DVD, floppy disk, etc. The above examples of license delivery are not intended to limit the scope of the invention in any way.

Client site 110 generally includes a target site or computer 112 and may include a local programming workstation 116 as just described. Used herein, client site 110 also includes the entity benefiting from a software license issued from license sales site 104. Target computer 112 includes any suitable computing device and preferably includes a central processing unit (CPU) 113 or the equivalent. It should be appreciated that target 112 may include multiple memory elements used for storing a variety of data and applications within its processing subsystem. Target computer 112 controls a site application, meaning any software application or execution mean that requires clearance from of a valid software license to run or execute its programs. Thus, as the name suggests, target computer 112 is the system in which the license from license sales site 104 is intended for. It should be realized that target computer 112 may include a single unit or comprise one or more units collectively referred to as target computer 112.

In one remote programming embodiment of the invention, programming workstation 117 establishes a connection with client site 110. The connection may be via the Internet, modem, or any other suitable communication channel, including wireless. Client site 110 typically includes a local area network (LAN) or an equivalent networking system within the site. In this sense, programming workstation 117 may communicate with client site 110, and more particularly with target computer 112, over, for example, an Internet path through a router/firewall that is coupled to a LAN at client site 110. Although not shown on FIG. 1, it should be appreciated that the connection from the LAN to target computer 112 may be through a TCP/IP link or the like. Alternatively, the connection between programming workstation 117 and target computer 112 may be partially or entirely via a wireless path. Once the connection between programming workstation 117 and target computer 112 is made, a file upload to target computer 112 can be done.

In one local programming embodiment of the invention, local programming workstation 116 establishes a connection with target computer 112. Any suitable connection technique or path may be used to facilitate routing between machines, such as modem connections to the CPU and the previously mentioned LAN and TCP/IP connection links. Once the connection between programming workstation 116 and target computer 112 is made, a file upload to target computer 112 can be done.

Exemplary Work Flow Diagram for Software Site Licensing

The present system streamlines the software licensing process and provides an improved method for users to purchase licenses on a factory-direct basis from the vendor. The licenses are generally in the form of binary computer files (intangible objects) and can be purchased using the same means as hardware, e.g., CPUs (tangible objects), direct from the vendor. Because the vendor is able to identify and track the hardware from the moment of manufacture (both in physical form and data form), it is helpful to review the workflow process exemplary to this invention from the factory to the client site.

The disclosed system integrates particularly well with conventional end-user equipment order entry systems, such as those often operated as part of an Enterprise Resource Planning (ERP) computer processing system. ERP combines all departments and functions across a company into a single, integrated software program that runs off a single database. The various departments can easily share information about an order, inventory, accounts, or the like, and communicate with each other efficiently and immediately. In other words, the various departments can look into other departments to check order status, payment history, inventory, etc. Using the ERP system or equivalent, the software site licensing system and methods of the invention allow licensing and tracking information to be shared amongst various departments and entities.

It should be recognized that used herein, end-user may include the purchasing customer or dealer, and unless specifically stated to the contrary, these terms may be used interchangeably. In addition, the front office may include the vendor, OEM seller, or dealer, and unless stated to the contrary, these terms may also be used interchangeably. The present system and method for software site licensing may include a multi-tiered process having several entities involved from the manufacturer to the end-user. Alternatively, the end-user may correspond directly with the vendor, which in some cases may also be the manufacturer.

Figure 2:
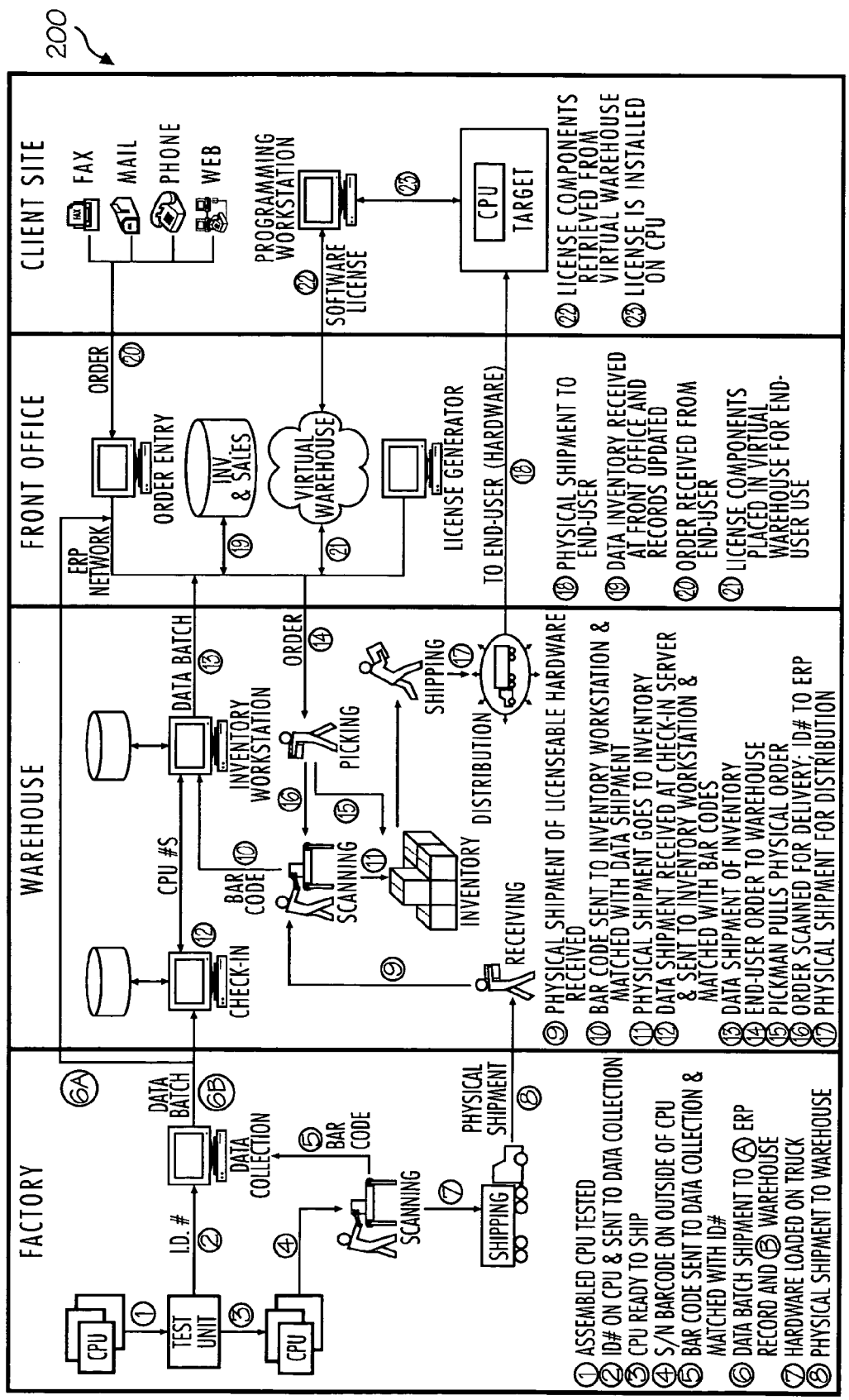
FIG. 2 is an exemplary work flow diagram for a software site licensing system in accordance with the invention.

FIG. 2 illustrates an exemplary work flow diagram 200 for a software site license system in accordance with an embodiment of the invention. The present invention provides improved coordination between four main entities, a factory, a warehouse, a front office, and a client site. Within each of the four described entities, the workflow is illustrated for both the physical shipment (e.g., CPU) as well as the data shipment (e.g., intangibles) in accordance with the invention. Additionally, the Figure illustrates a step-by-step process flow with corresponding numbered descriptions. It should be appreciated that the steps are presented in sequence for ease of discussion and, unless stated otherwise, not to set forth any particular order.

Beginning in the factory, each hardware licensable component is assembled and tested (1). Licensable components may include, without limitation, various interface devices, prepackaged systems, endpoints, peripheral devices, CPUs, call processing card (CPC), server keys, or any other manufactured device that is preferably capable of containing electronically stored unique identifying information. For ease of discussion, it is assumed for this particular embodiment, and elsewhere within this disclosure, that the hardware licensable component is a CPU, however, the scope of the disclosure is not intended to be so limiting. CPUs that pass quality assurance tests are "serialized" with preferably two sets of unique numbers. A unique ID# is applied or stored in the CPU internally in a non-volatile memory location. This number is collected in a central data collection database (2). Externally, a bar code/serial number or similar type identification is applied to the CPU (4) and this number is also collected in the central data collection database (5). Before shipping the hardware from the factory, all codes are compared and matched with the matched data batch numbers being saved in the central database.

The association between the external sticker and internal ID numbers is recorded in the front office records to facilitate identification of each hardware unit as a valid manufactured system component (6A). When a software site license is eventually installed at the CPU, it is specifically created to form a bond with the CPU based upon the CPU's unique numbers. The data batch of ID numbers is also provided to the warehouse manufacture records (6B). In a preferred embodiment, the front office system periodically polls the factory and/or manufacturing records and retrieves the software data. Alternatively, the factory can provide the data to the front office. This data file is generally received at the warehouse and front office at substantially the same time that the physical shipment leaves the factory (8).

Referring now to the warehouse portion of the diagram, when the physical shipment of licensable hardware is received (9), the external ID is provided to an inventory workstation (10), for example through an electronic scanning device. The ID is verified against the data files received from the factory to ensure there is a match (12). If there is not a match in the data batch on file for the unit, then possibly the wrong physical shipment was received and may not be accepted into inventory. However, if a match is made, then the unit is received into inventory and is readied for future distribution (11). In one particular embodiment, the manufacturing record is deleted from the warehouse check-in server after a match is made (12) to prevent multiple receipts of the same unit.

The warehouse sends a record of the inventory data batch to the front office (13), and the front office inventory and sales records are updated to reflect the available inventory (19). As previously mentioned, the present system integrates with ERP networks currently being used by front office sales sites. In this manner, the data records (i.e., ID numbers corresponding to the physical units) are provided to the front office ERP network, or the like, and when a license associated with a received serial number is to be generated, the data is readily available.

An order for licensable hardware is placed and received with the front office (20). There are numerous methods available for placing an order such as by facsimile, mail, phone or online web order. The system receives the hardware order and may first check the inventory records to verify the requested hardware is in stock, and then forward the order to the warehouse (14). In the warehouse, the hardware order is pulled from inventory (15) and the external ID on the hardware unit is recorded (16). Recall that the front office inventory and sales records already has an accounting of how many units are available as well as the ID numbers associated with each of the units. However, in one particular embodiment, the front office does not know which unit is going to be pulled to fulfill the order until the external ID on the pulled unit is sent back to the front office. At this point, the front office records can be updated to include the ID number associated with a particular unit en route to the client site. The hardware (physical shipment) is then shipped from the warehouse to the end user or client site (18).

In accordance with the invention, the front office system reviews the order for licensable hardware and licensable features (generally intangibles). For instance, the order may include a CPU and various upgraded features. As just explained, the physical portion of the order (e.g., CPU) is sent to the warehouse for fulfillment, but because the intangible portion of the order is not considered a "shippable" component, this portion of the order remains in the front office. In accordance with the invention, a "virtual warehouse" is created for each particular end user to store intangible items. In this sense, the system reviews the intangible portion of the order and places the individual line items representing the licensable features or components into the user's virtual warehouse (21). Because the front office receives data on the shipped CPU from the warehouse, the items in the user's virtual warehouse can already be associated with that particular CPU and CPU numbers.

A programming workstation (e.g., programming workstation 116-117) connects to the end user's virtual warehouse, for example via an Internet connection, retrieves a generated license (22) and installs the license on the shipped CPU (target) (23). The particular details of the license retrieval, license generation, and storage of intangible items in the virtual warehouse will be fully discussed in the following sections. However, installation of the license onto the target is beyond the scope of this particular invention and will not be discussed. For additional information on exemplary techniques for software site licensing and the installation thereof, refer to commonly owned U.S. patent application Ser. No. 10/641,853 filed on Aug. 15, 2003, the contents of which are incorporated herein by reference.

Exemplary Flowcharts for Software Site Licensing

The previous discussion assumed coordination between four entities, however it should be realized that this does not have to be the case to fall within the scope of the invention. Accordingly, the following exemplary flowcharts are provided as further embodiments and illustrations for the various operations of the present invention.

Figure 3:
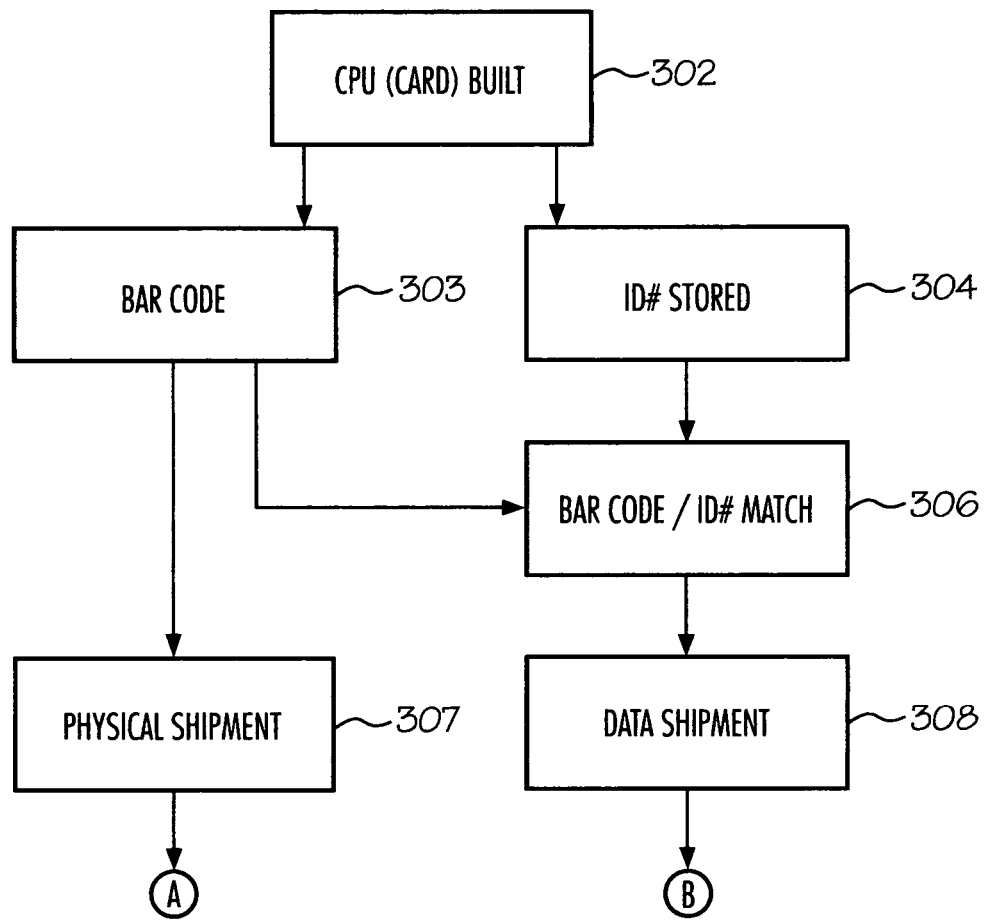
FIGS. 3-7, 13 and 15 are exemplary flow charts of various operations of a software site licensing system in accordance with the invention.

FIG. 3 is a flow chart of the operation generally carried out by a hardware manufacturer. Initially, the CPU or other licensable device, is built (step 302). A serial number, bar code, or similar ID number is attached to the device (303) and an unique ID number is electronically stored on the device (step 304). The external and internal numbers are matched (306), recorded and become part of a "data shipment" or transmission (step 308). The coded CPU is ready for delivery and constitutes a physical shipment (step 307). It is important to realize that at this point, the CPU vendor is able to track the CPU both physically and electronically.

Figure 4:
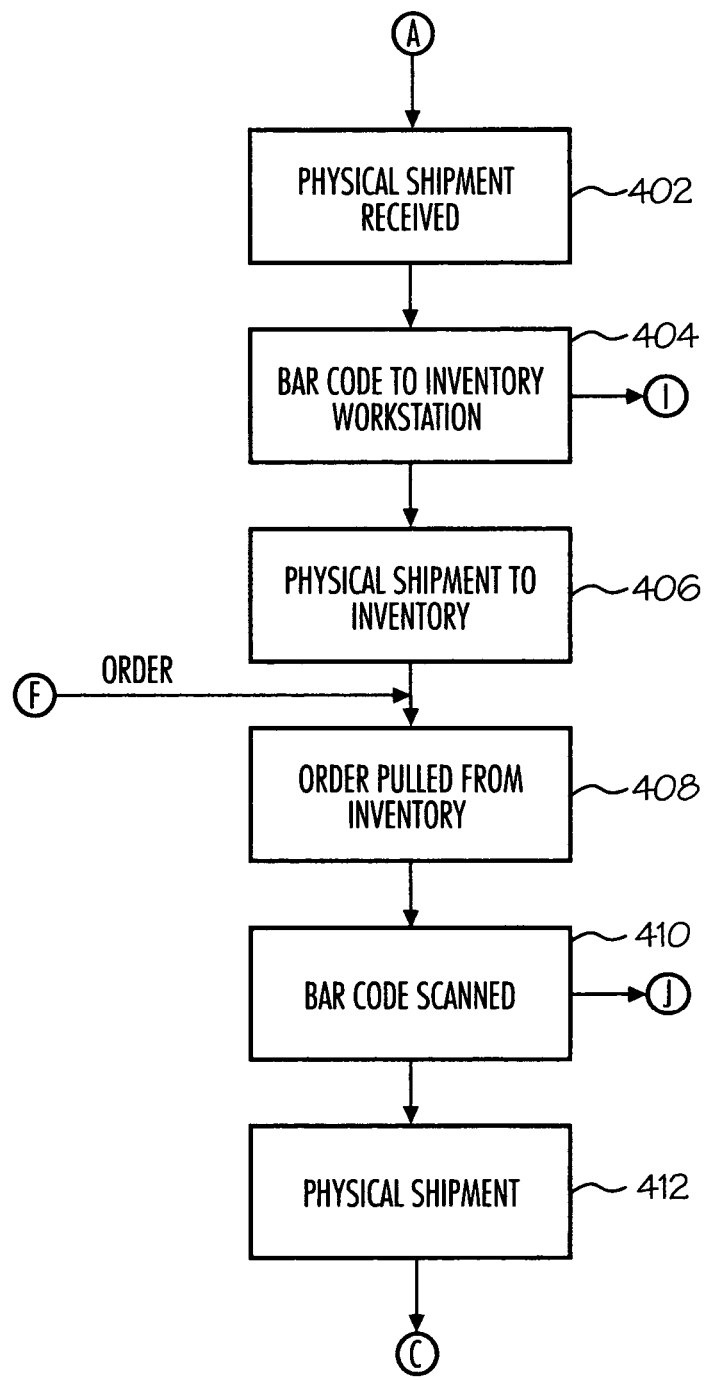

FIG. 4 is a flow chart of the operation of the physical shipment continuing from FIG. 3. The physical shipment is received, for example, at a warehouse (step 402). The bar code on the outside of the CPU is read to "check-in" the shipment to an inventory workstation (step 404), and the physical shipment is placed in inventory (step 406). When an order is received, the physical components of the order are pulled from inventory (step 408). Prior to shipping, the bar code is read from the unit (step 410). At this point, the user's virtual warehouse and intangible items contained within can be updated to link the shipped unit with the user. The hardware is then shipped to the client site (step 412).

Figure 5:
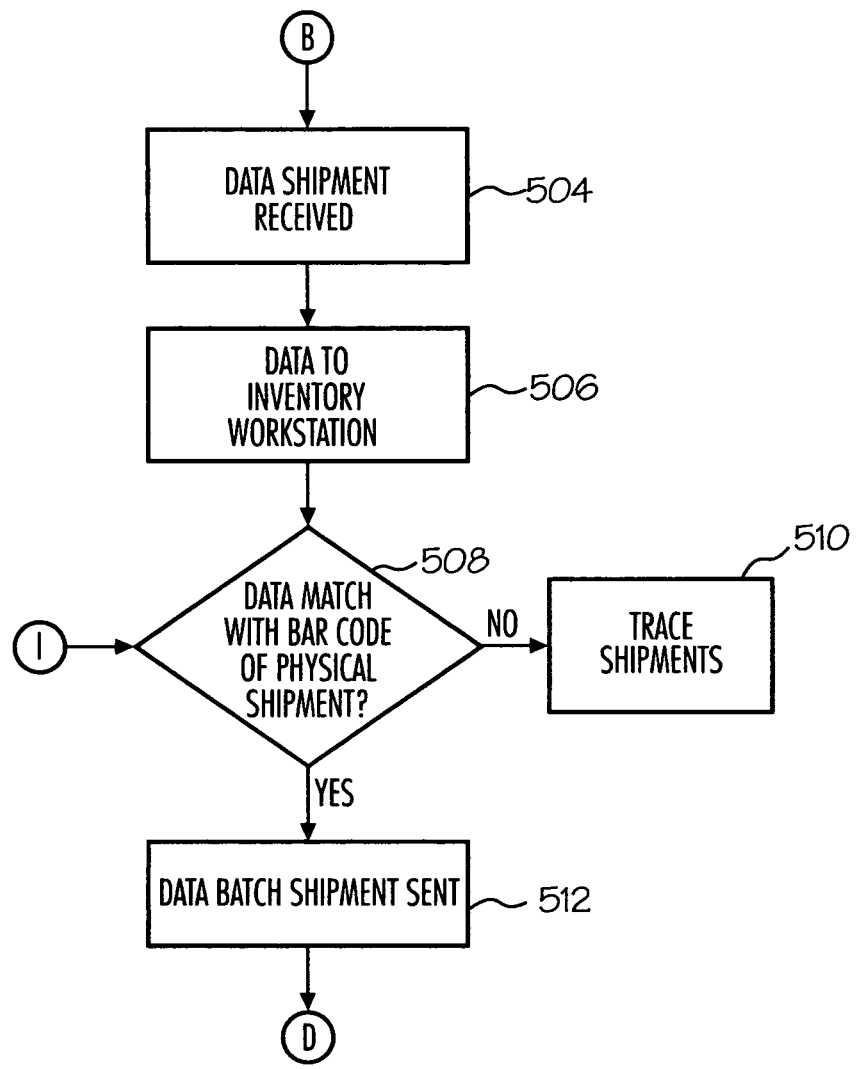

FIG. 5 is a flow chart of the operation of the data shipment continuing from FIG. 3. The data shipment is received, for example, at a warehouse check-in server and/or a sales office network server (step 504) and sent to an inventory workstation (step 506). It should be appreciated that the check-in server and inventory workstation may be separate units or combined. The data, which comprises ID numbers corresponding to recently shipped physical hardware, is matched with the bar code information checked into the inventory workstation (step 508). If a match is made, then the data batch shipment is provided to a sales office inventory and sales records database for updating (step 512). If, however, no match is found for a batch or a particular CPU, then the task of tracing the physical and/or data shipment begins (step 510).

Figure 6:
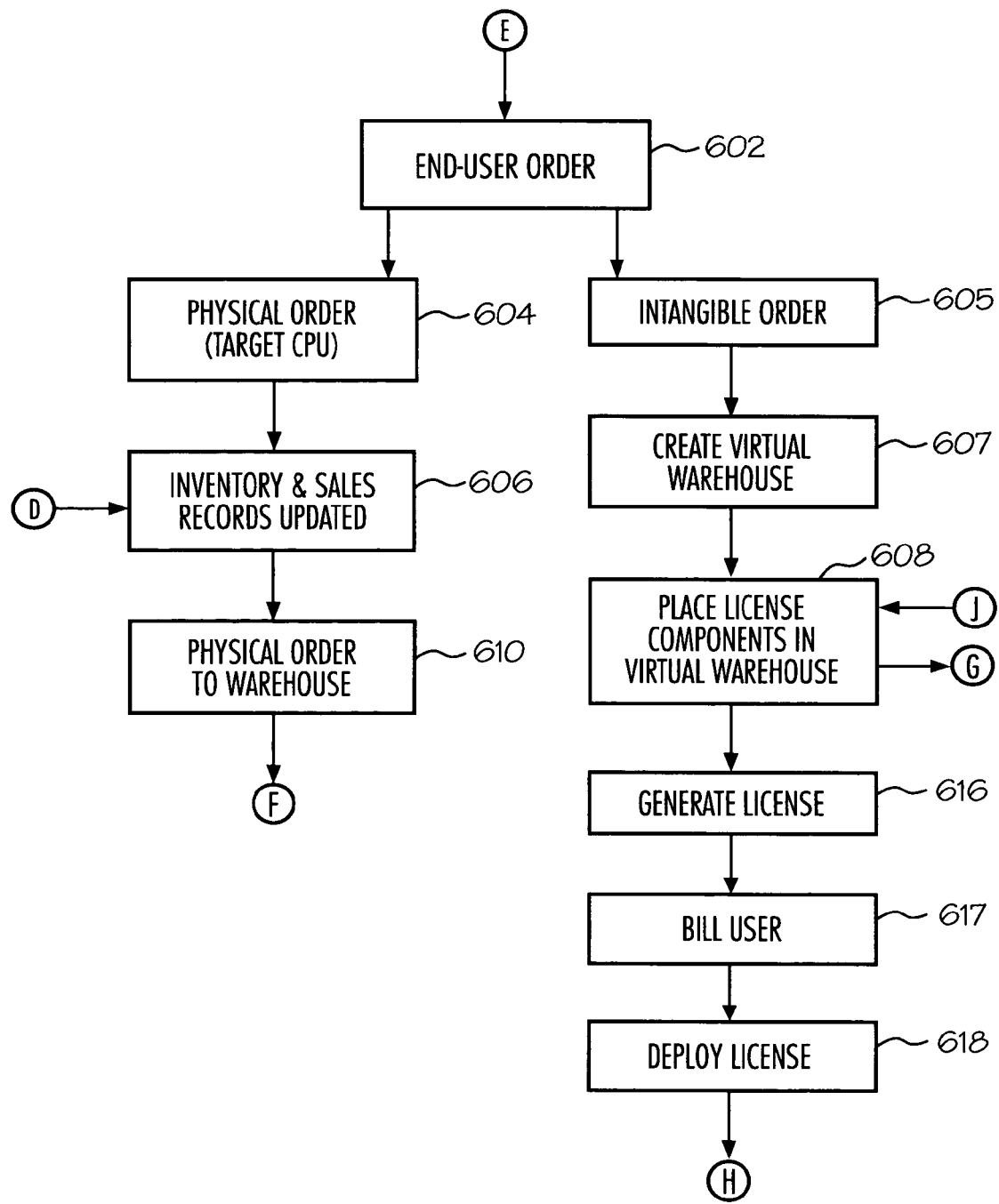

FIG. 6 is a flow chart of the operation of a sales office or vendor. An order for a licensable hardware component, intangible software component, or a combination of both, is received at the sales office (step 602). The order is reviewed, which may include a verification of the end-user's credit history and an inventory check to ensure availability of the physical order. The physical portion of the order, such as a CPU, is essentially separated from the intangible portions, such as a corresponding site license (steps 604-605). The vendor's inventory and sales records are updated to reflect the recent order (step 606). At this time, the identification numbers corresponding to the CPU may be assigned to the user. The physical order is then sent to the warehouse for fulfillment (step 610).

The intangible portion of the order, i.e., software license and components, are not physical so delivery by conventional shipping means is generally not available. Of course, intangible objects can be placed on suitable tangible mediums, such as CDs, DVDs, tapes, etc., and shipped with the physical delivery.

In accordance with the various aspects of the invention, the system creates a virtual warehouse for the user to hold intangible items purchased by the user (step 607). The license components of the user's order are placed in the user's virtual warehouse (step 608) for future pick up. A software site license is generated that is specific to the end-user and the target device (step 616) and remains in the user's virtual warehouse until a request to deploy the license is received. The user is billed for the order (step 617) at the time the entire order is received, the intangible order is placed in the virtual warehouse, the license is generated, or at the time the license is deployed. Of course, the timing of billing is not limited to the above exemplary times and may be dictated by local or state laws. The system then deploys the intangible license file to the end-user in any suitable manner specified by the end-user or vendor (step 618). The specific details of the virtual warehouse will be further discussed in the following sections.

Figure 7:
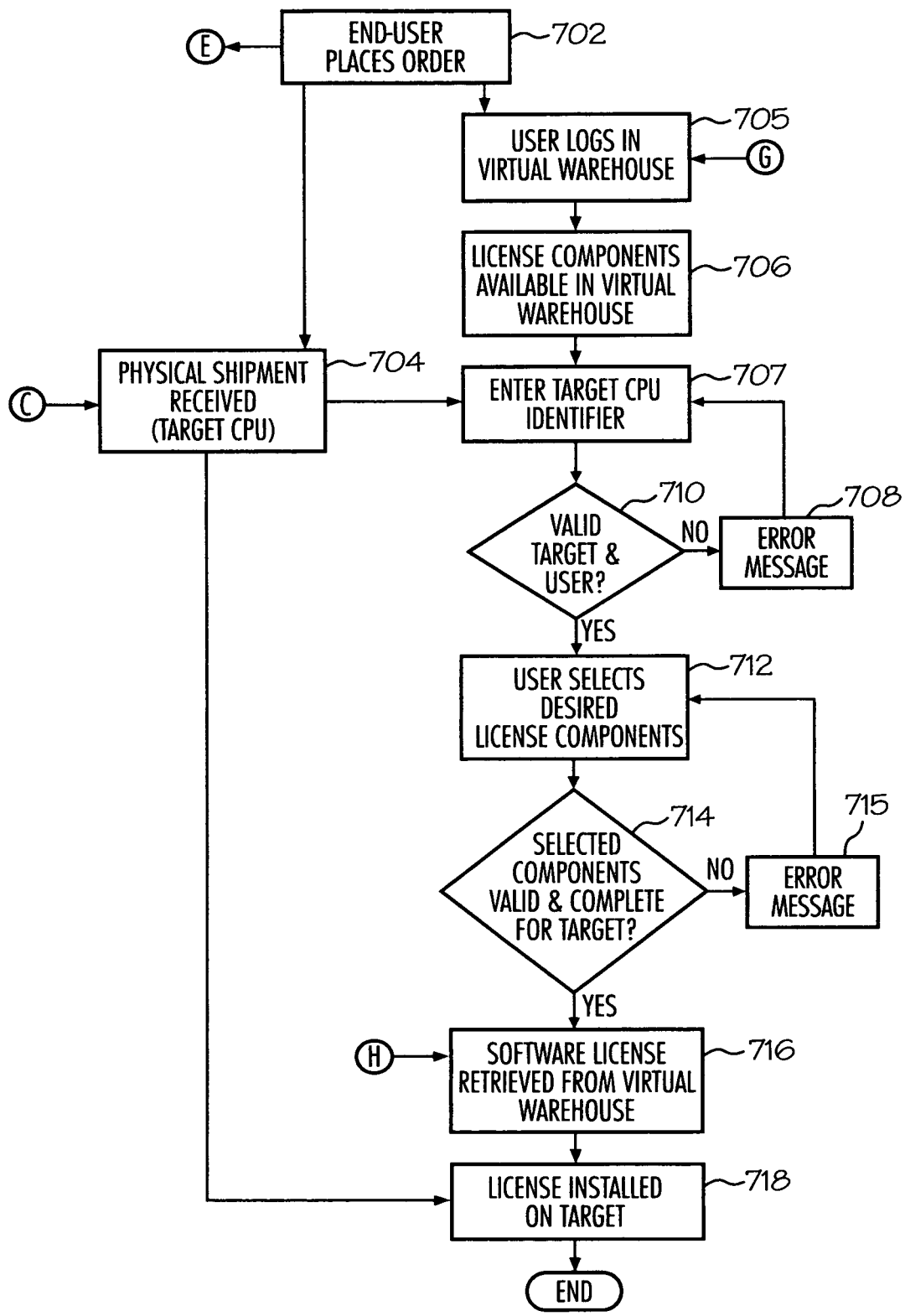

FIG. 7 is a flow chart of the operation of an end-user at a client site in accordance with the invention. Initially, the end-user places an order with a vendor for a licensable hardware component, intangible software component, or combination of both (step 702). As previously discussed, there are numerous techniques available to the end-user for placing orders. Sometime after the order is placed, the physical shipment is received at the client site (step 704). In this particular embodiment, the physical shipment includes a CPU, which for licensing purposes is the "target CPU." In accordance with various aspects of the invention, the CPU arrives with a bar code visible on the outside of the unit and an ID number stored in non-volatile memory within the unit. Keeping in mind that the numbers associated with the unit provide a means for physical and electronic tracking of the shipment by the vendor in accordance with the invention. For example, the vendor uses the electronic or data shipment to create and update the licensable components in the user's virtual warehouse.

Virtual Warehouse

With combined reference to FIG. 7 and the following figures, a detailed description of the virtual warehouse in accordance with the invention will follow.

Typically, when an order is received from the end user, the vendor verifies that the end user is in good standing with the vendor and then will either bill the end user for the order up-front or when the items are delivered. In the case of the virtual warehouse, it is preferable that the intangible items in the user's warehouse are pre-authorized and thus available at any time for the user to pick up. Assuming that the end-user status is in good standing with the vendor (if verification occurs), then the vendor will establish a virtual warehouse for the end user. Preferably, each end-user has its own virtual warehouse containing intangible items that are available for immediate use by the end user as part of a software site license.

There are several ways in which the vendor can determine what items to place in the user's virtual warehouse. For instance, when the end-user places an order for a certain device, the vendor's system may already know what standard intangible features are needed in the site license to permit full operation of the ordered device. In this situation, the user's virtual warehouse, once established, is filled with the standard features, usually as separate line items. The user may order additional features or upgrades for the device, which appear on the order to the vendor. The vendor can then charge or pre-authorize the user for the additional features and place them in the user's virtual warehouse as an available line item. In yet another method, the vendor may simply place a license with all the needed or additional features in the virtual warehouse as one all-inclusive line item. As those skilled in the art will recognize, there are other possible techniques for placing the intangibles in the user's warehouse that are within the scope of the invention.

Some time after the end-user places the order, the end-user or its authorized agent initiates communication with the virtual warehouse. In one embodiment, the virtual warehouse is a web site stored on a server monitored by the vendor. The user simply connects to a communication channel, such as the Internet, and routes to the virtual warehouse web page. The user may be prompted to enter an unique password/ID, which the system verifies as belonging to this user (step 705). In one particular embodiment, there may be various authorization levels of access to the virtual warehouse. For example, the user may be allowed to designate any number of priority levels for accessing the virtual warehouse. In one particular embodiment, there may be three levels of access as follows: level 1 priority is given to technicians for downloading features, licenses and performing license transfers; level 2 priority is given to management for building the license and purchasing features, such as when upgrading an existing license; and level 3 priority is given to the system administrator to perform, review and exercise all functions of the virtual warehouse on behalf of the user. The access levels may be linked to the particular user ID/password and further, the system may only display those functions permitted in that level. This embodiment may provide an extra security feature for the user and have particular usefulness in government-related applications where access to certain inventory items may be restricted.

Figure 8:
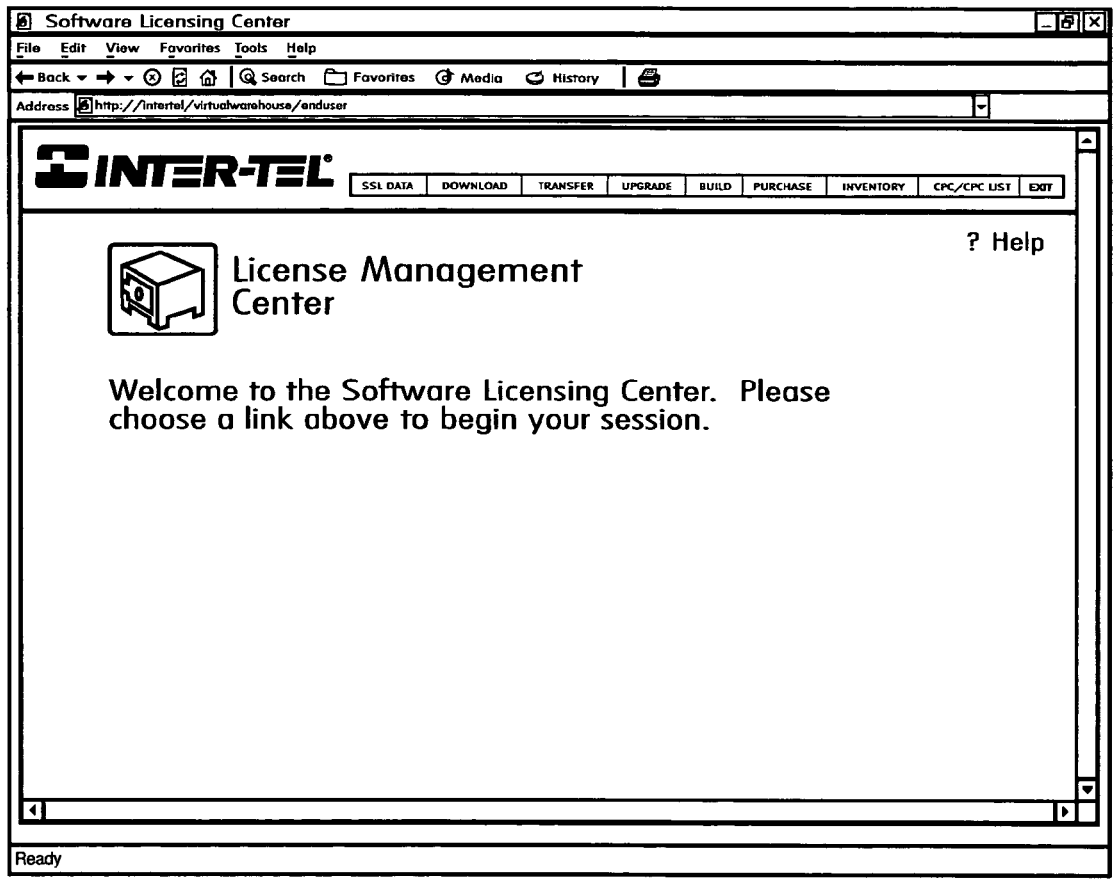
Figure 9:
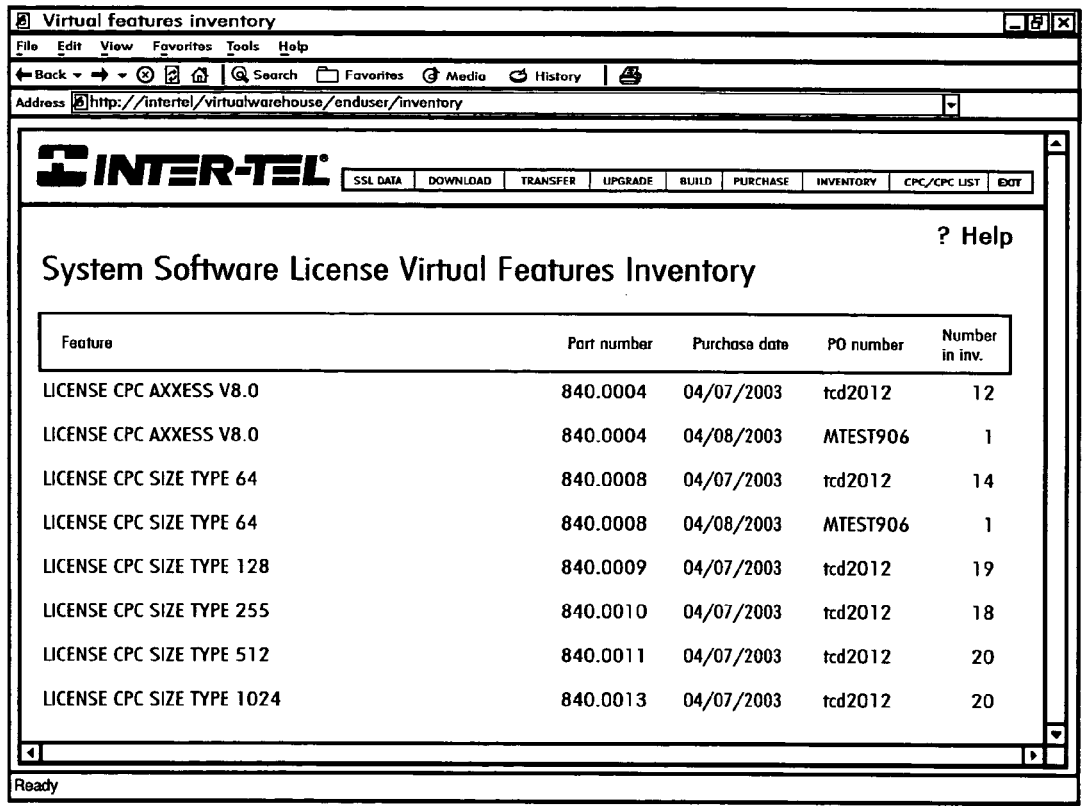

The user may then view a "welcome" page of the user's virtual warehouse containing several options, such as the example page of FIG. 8. Selecting the "INVENTORY" option displays the available license components in the user's virtual warehouse (step 706). FIG. 9 illustrates an inventory list of items in the exemplary end-user's virtual warehouse. For example, this particular end-user requisitioned twelve AXXESS® V8.0 systems on Apr. 7, 2003 with purchase order number "tcd2012". Preferably, each virtual item has an assigned part number to facilitate tracking and billing, and in this particular example, the AXXESS® V8.0 is part number "840.0004." As previously mentioned, it is preferable that the end-user pre-pay for the intangible items contained in the virtual warehouse so that these items are immediately available as personal inventory. Of course, payment does not have to be in the traditional sense of immediate money exchange; rather, payment may be a pre-authorization, such as on a credit card, established line of credit, or some other form of currency or non-currency payment or authorization.

Figure 10:
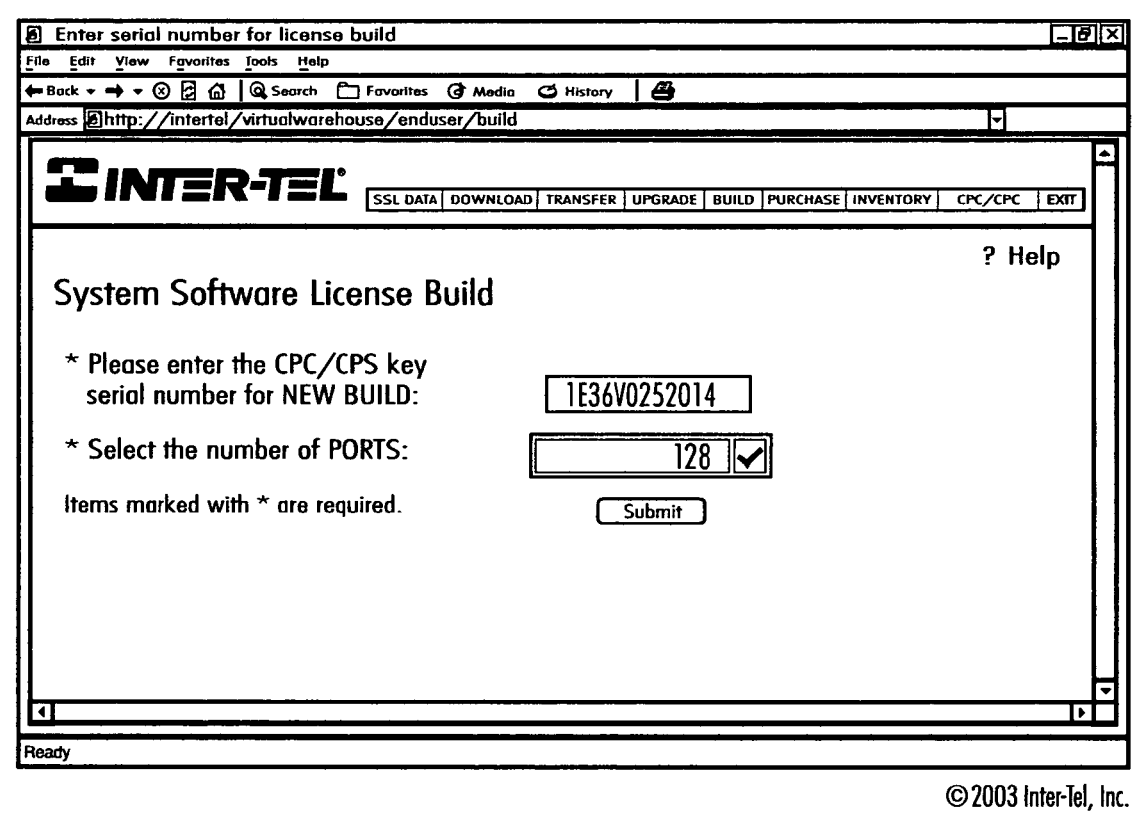

Another option available to the user at the virtual warehouse is "BUILD" designed to assist the user in assembling or selecting a license for a particular device. Referring to FIG. 10, the user is asked to enter an identifier number of the device (e.g., target CPU) the user wishes to build a software site license for. Recall that the device typically includes an external ID number used for tracking the device. In accordance with the invention, the ID number corresponding to the target CPU is already associated with the user due to the data shipment and record updates as previously described. The user enters the identifier number from the device (step 707) and the system validates the entry for the device and the user (step 710). For example, because the device is already associated with a particular user, if the user's ID/password do not match the entered device number, then the user may have been shipped the wrong device or is attempting to fraudulently license a device that is not linked to that user. If there is not a match between the user and the device numbers entered, then the system may display an error message (step 708) and request that the user re-enter the device number.

Figure 11:
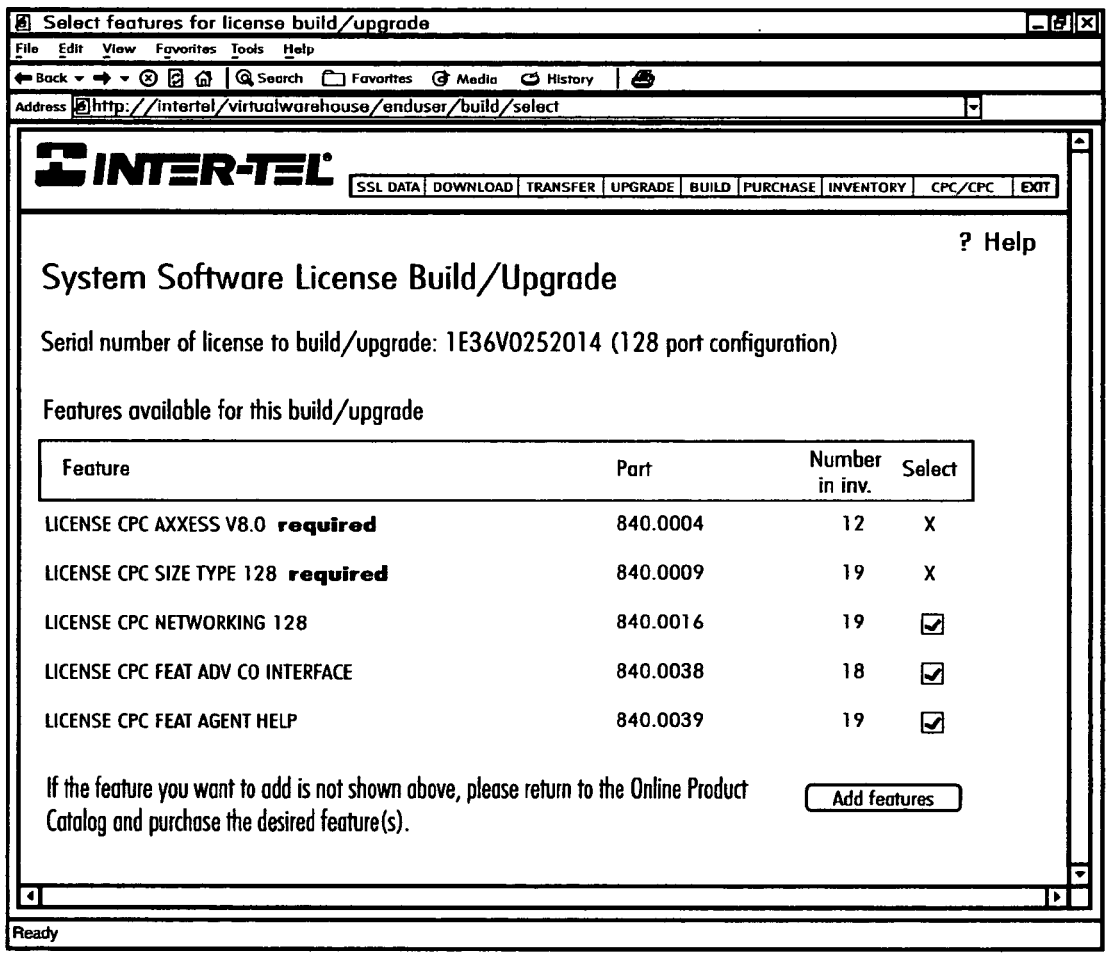

FIG. 11 illustrates the available features in the exemplary user's virtual warehouse for validly entered CPU and user IDs. The system may display all available features that can be assembled in the software site license for this device, to include required features as well as optional features. In this particular embodiment, only those features that the user already has in its personal virtual warehouse are displayed. However, in other embodiments, the system may display any feature that can be included in the license regardless of whether or not the feature has been purchased and is in the user's warehouse. Unpaid for items or those items that are not currently in the user's warehouse may appear on the display as highlighted to indicate the optional feature is available for this device, but not for immediate use by this user.

The user then selects the desired licensable features for the entered device from the personal inventory on the virtual warehouse (step 712). In the particular embodiment of FIG. 11, each licensable component includes a "SELECT" box that the user can choose to indicate the item is to be included in the license. Also, in this embodiment, features that are required for the device to function properly are properly indicated on the display and automatically selected as part of the site license. If the user does not see a desired feature in its personal inventory list, the user may be asked to request the feature from the vendor, e.g., order the feature, or go to an online catalog and purchase the feature. The system reviews the items selected by the user and confirms that the features are valid for the target CPU and that the selected features will make a complete license to enable the target to properly operate (step 714). If the system determines that a modification to the selected licensable components is needed before a license can be generated, then an error message may appear (step 715) and the user may be returned to the selection list of components. If the system verifies that the selected features can be assembled to create a valid software site license for the target CPU, then the system may proceed with the creation of a license. In one particular embodiment, the system may display all the features selected by the user to be assembled in the license and request confirmation of the selection and device prior to generating the license.

The generated license remains in the user's virtual warehouse until the user desires to retrieve the license for use in the target (step 716) and the license is installed on the target (step 718). In one particular embodiment, the generated license is a data file that is emailed to the user for immediate installation. In another embodiment, the license file is electronically transmitted to a programming workstation (e.g., programming workstation 116-117) and stored in a database of the workstation (e.g., storage 118) for future installation to the target.

Figure 13:
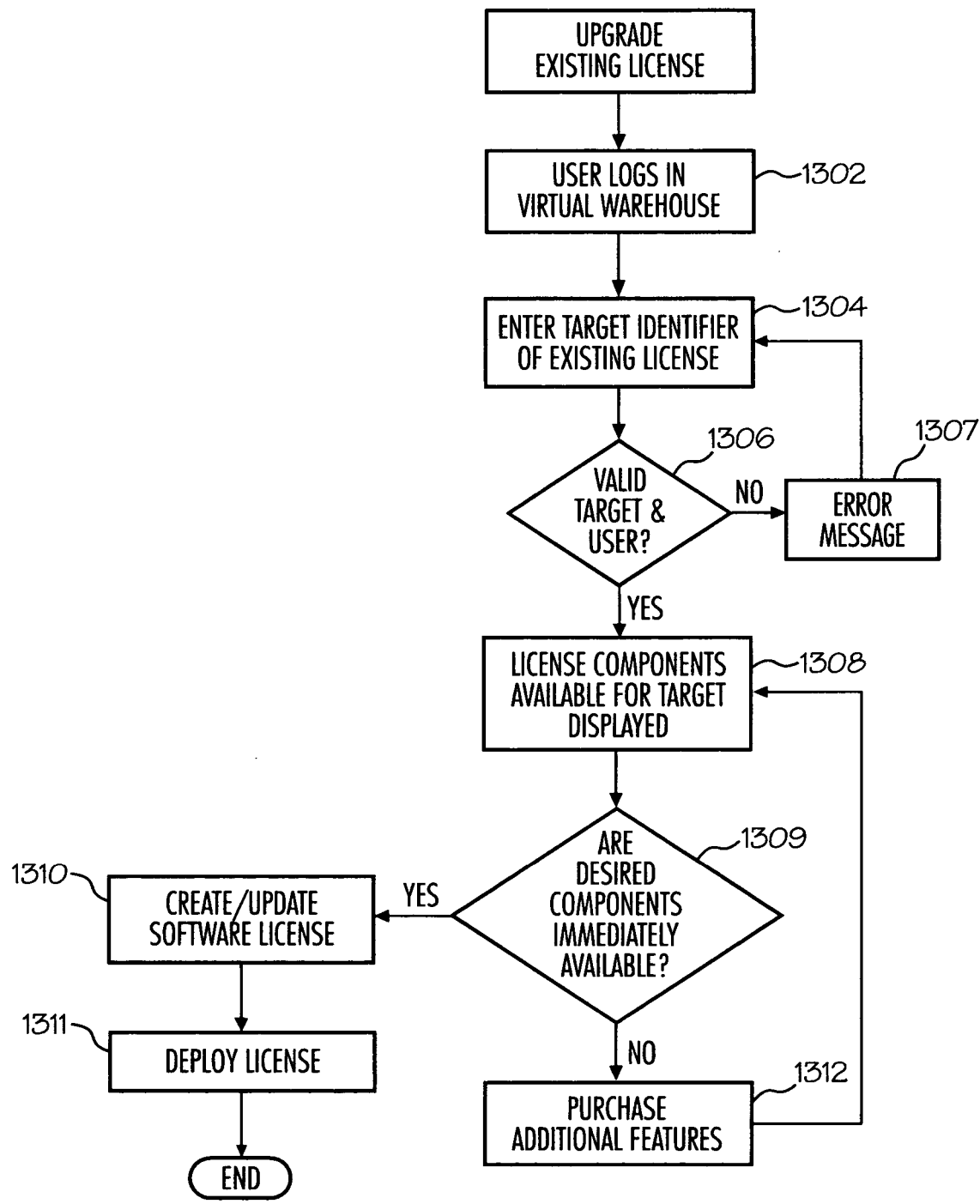

FIG. 13 is a flow chart of the operation for upgrading an existing software site license in accordance with an embodiment of the invention. The user logs into a personal virtual warehouse using a password/ID as just described (step 1302). The "UPGRADE" option on the virtual warehouse is designed to assist the user in assembling an upgraded license for a particular device. The user is asked to enter an identifier for the device (target) associated with the existing license (step 1304). The system verifies that the user information and the target information entered match as a valid combination (step 1306). If a match is not found, then the user may be attempting to upgrade an invalid or pirated license for that device, user, or site, and the system may generate an error message to the user (step 1307), and request that the user re-enter the target identifier.

Figure 12:
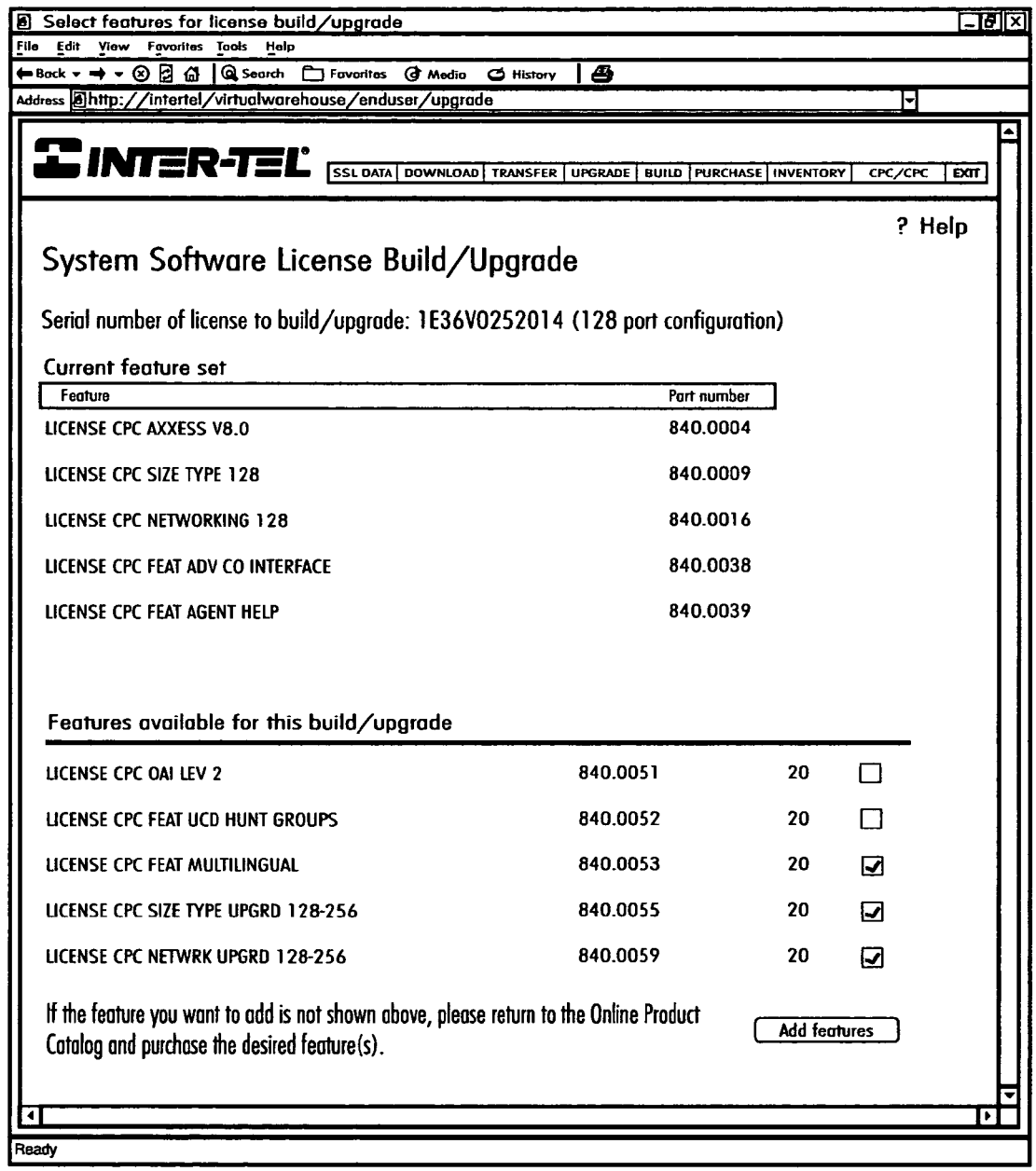

Assuming a match between the user and the device is found, the license components available for the target in the user's virtual warehouse are displayed (step 1308). In one embodiment, as illustrated in FIG. 12, the current features of the existing license for the target CPU are displayed, as well as available features for the target that are not currently on the site license. The user reviews the list of licensable components and decides if the additional features are immediately available (e.g., in the user's virtual warehouse) (step 1309). In this particular embodiment, only those available features that are in the user's personal inventory are displayed and the user is asked to return to the vendor if desired features are not currently in the user's inventory (step 1312). Alternatively, the system may display all the available features for the device regardless of whether or not the user has them in its personal inventory. The user then selects the desired features to upgrade the existing license and the software license is updated (step 1310). The license file is then deployed to the user in a manner chosen by the user or the vendor (step 1311) and any appropriate fees are charged to the user.

Figure 15:
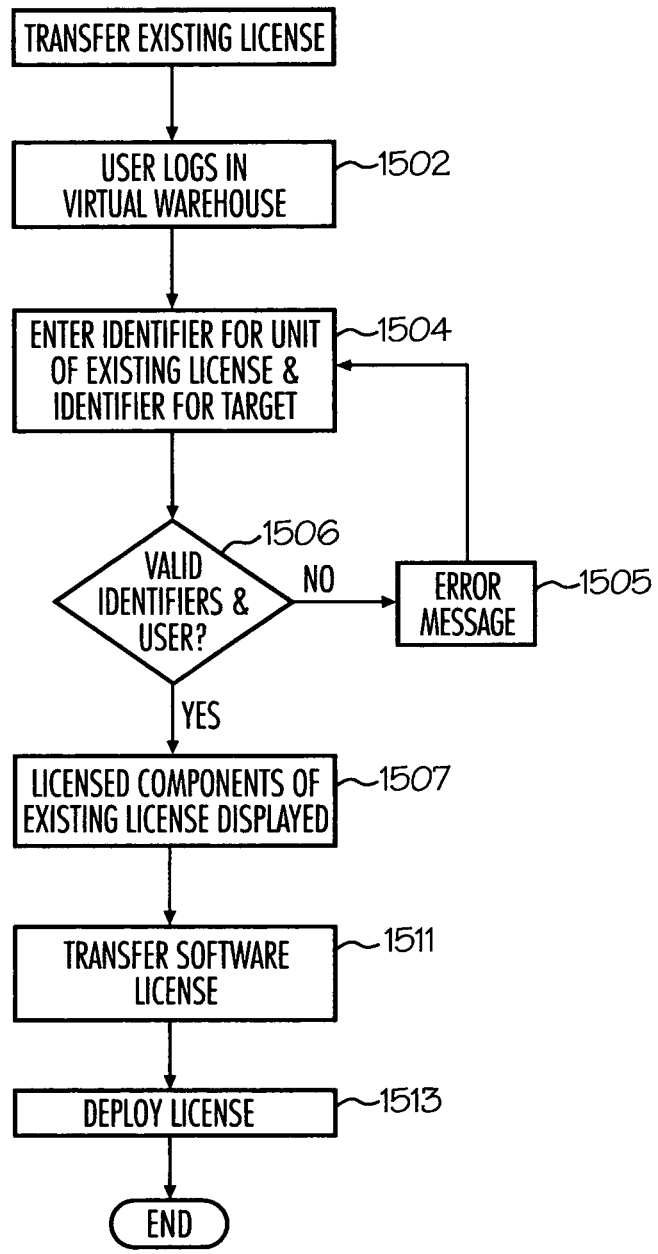

FIG. 15 is a flow chart of the operation for transferring an existing software site license assigned to a particular device to another device, in accordance with an embodiment of the invention. There are various situations which may require a transfer from one unit to another, such as if the device requires maintenance. In accordance with the invention, the licensee is not required to contact the licensor directly to have the license transferred. Rather, the user/licensee simply logs into the user's personal virtual warehouse in a manner as previously described and selects the "TRANSFER" option (step 1502). The system prompts the user to enter the ID numbers of the current unit the license is to be transferred from and the new unit the license is to be transferred to (step 1504). Preferably, the system verifies the information entered, e.g., that the currently licensed unit is associated with the particular user (step 1506), and provides the user with a summary of the current licensed features (step 1507). If the entered identifiers do not match the user, then the system may display an error message (step 1505) and request the user to re-enter one or all of the identifiers. The system may prompt the user to verify the transfer information and then update the records and transfer (e.g., associate the licensable features to the entered ID numbers of the new unit) the license (step 1511). The license may be deployed to the user, if required (step 1513). In the event the user desires additional components, features, or elements currently not in the existing license, then the user can select "UPGRADE" from the virtual warehouse menu and proceed to choose desired features (e.g., the description of FIG. 13).

The virtual warehouse of the present invention facilitates revenue and record keeping for the user, dealer and/or vendor. For instance, intangible sales such as software and software-related licenses are typically not taxed in the same manner as their physical counterparts. In some jurisdictions, the intangible sale is not consummated until the user actually receives the goods, as in a download of software or license. This can be problematic for vendors because until the physical unit is received at the client's site, the software may not be actually "sold" to the user. However, a virtual warehouse, in accordance with the principles of the invention described herein, provides holding or temporary inventory for the intangibles purchased by the user. At any time, the vendor and user can access the virtual warehouse, view the inventory, and compare the inventory with sales/tax reports.

Software Site Licensing System—Dealer Embodiment

Figure 14:
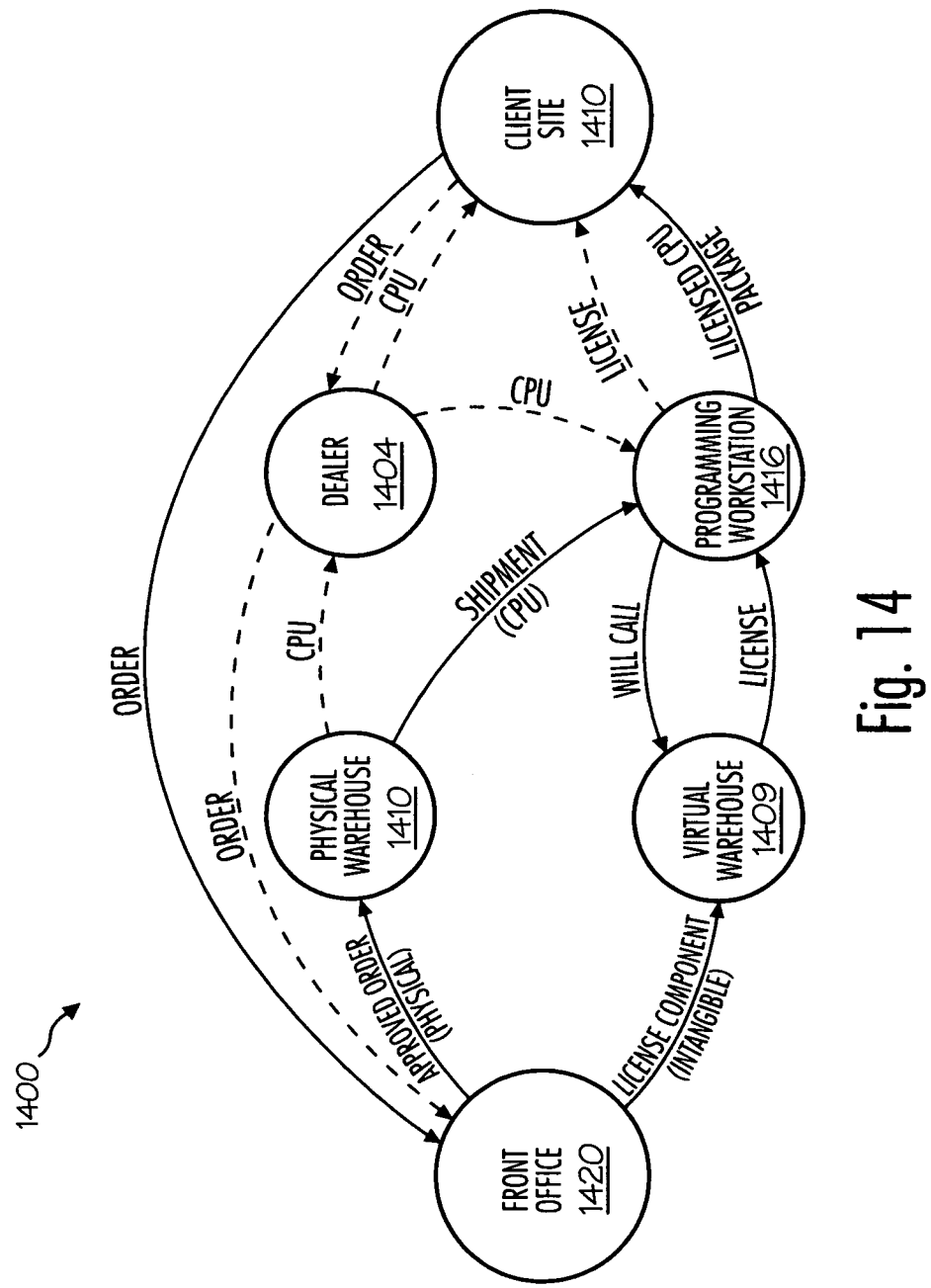
FIG. 14 illustrates an exemplary software site license system in accordance with a dealer embodiment of the invention.

FIG. 14 illustrates an exemplary software site license system 1400 of the present invention in accordance with a dealer embodiment. System 1400 generally includes a dealer 1404, a programming workstation 1416, a client site 1410, a virtual warehouse 1409, a physical warehouse 1410, and a front office 1420. It should be realized that various other intermediaries may participate in the physical and/or electronic routing of the client's order even though they may not be presented on the current figure.

Similar to previously described system 100, the current embodiment includes a client site 1410. The client places an order consisting of a physical component, an intangible component, or a combination of both. The order can be remitted directly to front office 1420 from the client site, or as is often the case in dealership sales, the client and dealer discuss the client's particular needs and the dealer handles the ordering on behalf of the client.

Dealer 1404 may include any wholesale or retail sales facility with the capacity to receive client orders from client site 1410 and front office 1420. Additionally, dealer 1404 may include technicians for installation, maintenance, and support of any products ordered through the dealer, such as hardware and software packages.

Front office 1420 receives the client's order in a similar manner as previously described. The approved order, meaning the client's credit status is approved and/or the inventory stock is approved, is forwarded to physical warehouse 1410 for picking and shipping of the physical component of the order. The physical shipment, such as a CPU, may be shipped to dealer 1404 on behalf of the client. Dealer 1404 may have programming workstation 1416 on site whereby the physical shipment does not need to be transferred except to client site 1410. Alternatively, the physical shipment may be sent directly to programming workstation 1416 on behalf of the client or the dealer.

The intangible component of the order, such as a software license file corresponding to the physical component, is forwarded to virtual warehouse 1409 for future pick up. Virtual warehouse 1409 is similar in nature and function as the previous descriptions of a virtual warehouse in accordance with the invention. As such, in one preferred embodiment, the license components in the virtual warehouse 1409 include the personal intangible inventory of typically prepaid-for or pre-authorized items. Programming workstation 1416 connects to virtual warehouse 1409 in any of the manners previously described and requests the license file associated with the physical shipment. It should be realized that the physical shipment does not need to be received in order to retrieve the corresponding license file. Recall that the physical shipment is being tracked by several ID numbers, including an external ID number. When the physical shipment is pulled from inventory at physical warehouse 1410, the external ID number is linked to the client or dealer depending on the order placement. So once the number is linked and known to the installer, the license file can be retrieved from virtual warehouse 1409. The retrieval is akin to a ticket will-call, meaning that the license file or components in the virtual warehouse are generally pre-paid or at least authorized for immediate use. At the programming workstation, the will-call license is distributed on behalf of the client or dealer and may be stored at the workstation until installation to the physical component.

In one embodiment, the client orders a packaged system including the hardware and any corresponding software already preloaded thereon. In this manner, the system is prepared for the client with the software and license installed when it arrives at the client site, so generally no further association between the hardware and software is needed. In another embodiment, the physical component is delivered to client site 1410 without the corresponding software license and programming workstation 1416 is coupled to the target to install the license. The workstation may have the license file stored in a memory of the workstation, or at the time of the license installation the programming workstation may connect to virtual warehouse 1409 and download the license file directly to the target at client site 1410.

As previously discussed, the virtual warehouse in accordance with the invention includes intangible items available for immediate use by the user. In one particular embodiment, the user is billed for the entire order (i.e., hardware and intangibles) at the time the order is received by the front office, vendor or dealer. In another embodiment, the user may defer billing of the intangible portion of the order until the items are placed in the user virtual warehouse, assembled into a software site license, or transmitted to the user or the user's representative. In the latter embodiments, the items are still available for immediate use by the end-user, but the end-user enjoys a delayed billing until the items are actually used.

Presented herein are various systems and methods for software site licensing, including the best mode. Having read this disclosure, one skilled in the industry may contemplate other similar techniques, modifications of structure, arrangements, elements, materials, and components for software site licensing that fall within the scope of the invention.

For instance, in one embodiment, the software site license may include a timing function such that upon a pre-determined expiration date, the license will not work properly. Provisions may be made to warn the user in advance that the license is nearing expiration and to contact the license sales site (i.e., the user's virtual warehouse) for renewal.

In another embodiment, a master license may be downloaded to a programming workstation and distributed to multiple system sites for use at multiple locations. For example, a master license file can be associated with multiple licensable hardware units such as a list of the hardware units eligible for upload. In this manner, the master license may include the same feature set replicable to multiple units, but downloading from the virtual warehouse would occur in a single step to the programming workstation. In a particular embodiment, each hardware unit may be coupled to the programming workstation whereby the workstation verifies that the unit is listed as eligible to receive a license. If the hardware unit is eligible then the programming workstation sends a license to the unit that corresponds to the unique identifiers of that unit.

In yet another embodiment, a master license may be downloaded from the virtual warehouse to a programming workstation. The master license may include a list of eligible hardware units available to receive a license. The license is uploaded from the programming workstation to a single eligible hardware unit. The eligible hardware units are preferably networked together on a peer-to-peer basis allowing the master license to be communicated between the units. In this manner, the master license is replicated from the first hardware unit to each eligible hardware unit and is installed on each unit. The above master license embodiments are not intended to be limiting and it should be realized that various other master license applications are within the spirit of the disclosure.

It should be realized that the intangible portion of the order was conveniently described as a license file however, the disclosure is not so limiting. The virtual warehouse of the invention has various uses beyond housing license files and licensable components. The virtual warehouse provides an easy venue to line-item intangible objects that can remain in the warehouse until the user desires to utilize them. For example, a myriad of intangible-type items may be contained in the user's virtual warehouse, such as support, maintenance, and warranty agreements, as well as other non-physical items. The user may wish to purchase a support or warranty extension beyond what the manufacturer supplies and placing a line-item in the warehouse provides a reliable tracking and billing forum for the user and the vendor.

For the sake of brevity, conventional techniques for signal processing, data transmission, signaling, and network control, and other functional aspects of the systems (and components of the individual operating components of the systems) may not be described or illustrated in detail herein. Further-more, the connecting lines shown in the various figures contained herein are intended to represent exemplary functional relationships between the various elements. It should be noted that many alternative or additional functional relationships and/or physical connections may be present in a practical software site licensing system.

The invention claimed is:

1. A software site license system comprising:
   a client site having a target hardware device, said hardware device having a unique identifier;
   a virtual warehouse website specifically for a single end user, said virtual warehouse having a storage comprising a personal inventory of intangible software components, said personal inventory being associated in said warehouse with only said end user and only said hardware device unique identifier;
   a license generator generating a software site license comprising one or more of said components for said target hardware device, said software site license being stored in said virtual warehouse storage for later use; and
   a programming workstation in communication with but separate from said target hardware device, said programming workstation displays said components of said end user virtual warehouse for said end user to select and confirm contents of said software site license prior to said license generator generating said license, said programming workstation receiving said software site license from said virtual warehouse storage and storing said license on behalf of said target device until installation of said license on said target hardware device.

2. The software site license system of claim 1, wherein said programming workstation receives an electronic file transfer comprising said license.

3. The software site license system of claim 1, wherein said programming workstation retains a copy of said software site license after installation.

4. The software site license system of claim 1, wherein said virtual warehouse comprises a multi-password protected website comprising entry of a password unique to said client site and an ID unique to said target hardware device.

5. The software site license system of claim 4, further comprising a priority level of access to said virtual warehouse.

6. The software site license system of claim 1, wherein said license sales site receives a purchase order from said client site comprising said target hardware device and in response to said order, a license sates site establishes said virtual warehouse for said client site and places said licensable components for said target hardware device in said virtual warehouse.

7. The software site license system of claim 1, wherein said software site license comprises a master license for multiple target devices.

8. The software site license system of claim 1 further comprising:
   a representative of said client site; and
   a purchase order prepared by said representative and received at a license sales site, said order comprising said target hardware device, said representative having said programming workstation and installing said license to said target device prior to delivering said target to said client site.

* * * * *